Feb. 16, 1954

G. R. CULBERTSON 2,669,457

SYNCHRONIZED VEHICLE MOTION CONTROLLED
RECORD REPRODUCING TALKING UNIT

Filed April 7, 1950

George R. Culbertson
INVENTOR.

BY
Attorneys

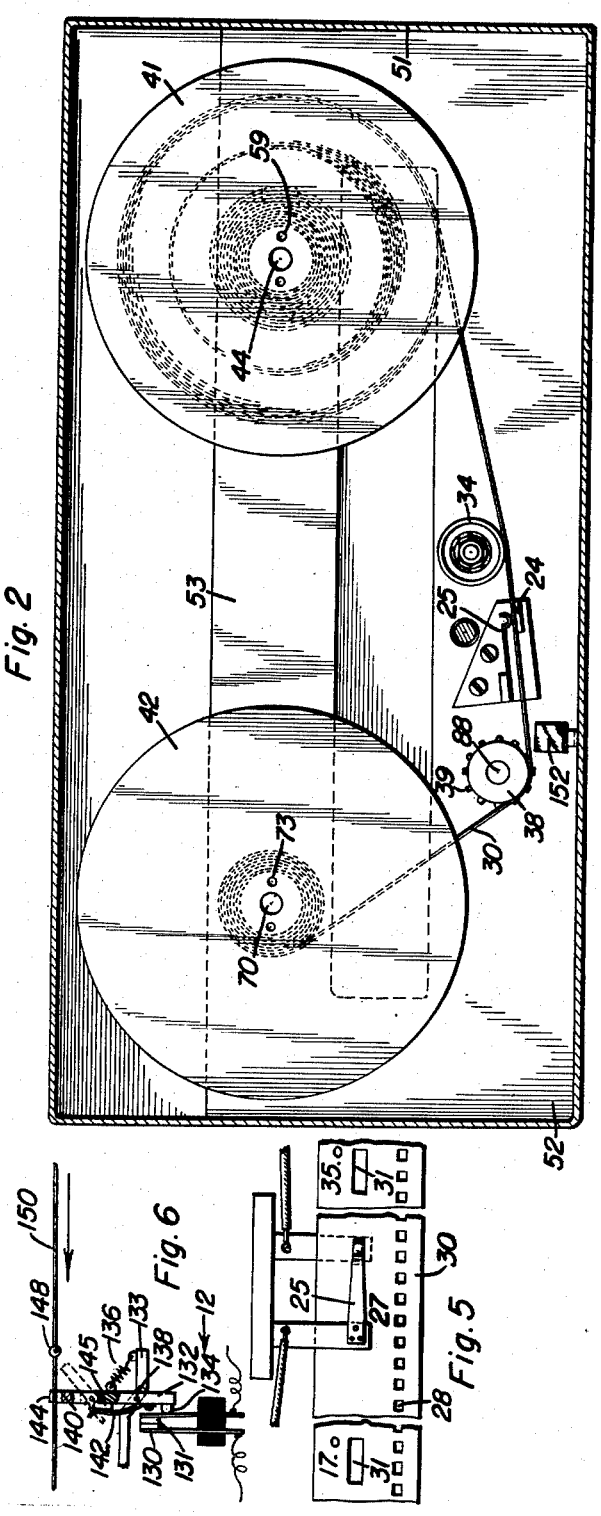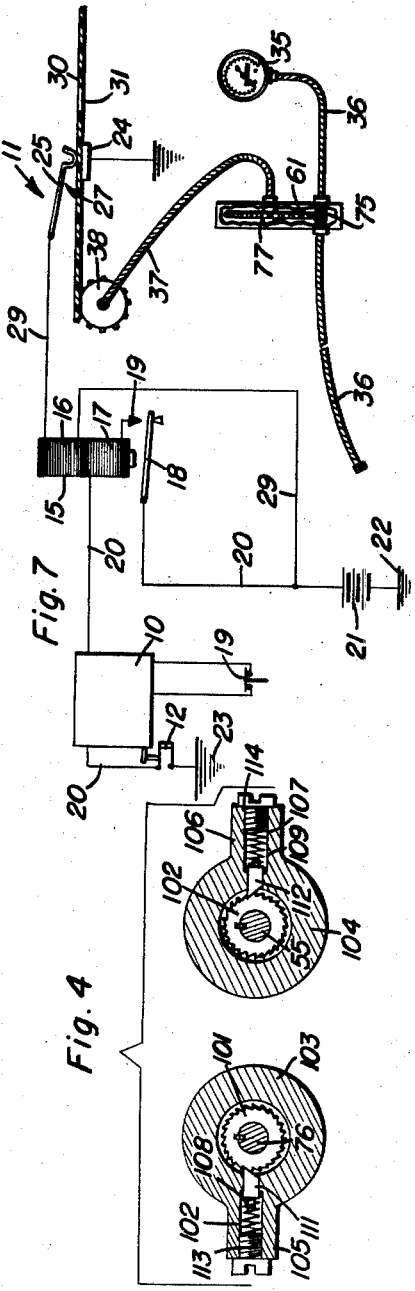

Patented Feb. 16, 1954

2,669,457

UNITED STATES PATENT OFFICE 2,669,457

SYNCHRONIZED VEHICLE MOTION CONTROLLED RECORD REPRODUCING TALKING UNIT

George R. Culbertson, Norfolk, Va.

Application April 7, 1950, Serial No. 154,483

5 Claims. (Cl. 274—1)

This invention relates to the automatic control of speech reproducing apparatus operated by a prepared record and it has for its primary object to provide a control system for apparatus of this type arranged on a moving vehicle which permits to exercise an automatic control of the delivery of the record operated speaking apparatus which is dependent on a factor connected with the movement of the vehicle, such, for instance, as the distance covered by the same or the like.

Automatically controlled record playing speaking apparatus on vehicles have repeatedly been proposed; but these apparatus have almost invariably been warning apparatus on devices having the purpose to give a warning signal to the driver of a vehicle, such as a car or a locomotive, indicating that a crossing, another vehicle or some potential obstacle requiring full attention is approaching. Warning signals of this type are therefore controlled from points outside the vehicle in motion, either by circuits mechanically or inductively closed upon a passage of a certain locality or by circuits which are closed upon the reception of electromagnetic waves radiated from a given spot or from another vehicle or by circuits closed upon actuation of a photo-electric device actuated by a light beam.

The present invention relates to record reproducing speakers on a vehicle which are exclusively controlled by the moving vehicle itself on which the apparatus is mounted. The primary purpose of the record reproducing speaker is that of supplying a constant or intermittent stream of information, any warning which may be given being only included incidentally and in a general manner. The apparatus may, for instance, provide the names and explain the monuments, buildings or sites which are passed when travelling along a road or the apparatus may give directives and supply guidance for an involved route to be followed by the driver of a vehicle or the apparatus may supply a detailed technical or scientific information, if built into a vehicle touring an industrial establishment and the like.

Essentially the system according to the invention should be capable of providing all kinds of information for amusement or for educational or industrial purposes which is usually only available and accessible in print, this information being provided to persons travelling in a vehicle at the proper moment when the object to which the information relates is in sight.

As an example it may be stated that, for instance, all the monuments, sites and objects to be seen along a road and their historical, economical and generally interesting features and connotations may be explained to the driver and to the passengers of a car travelling along certain roads or along streets of a city. Or else vehicles such as the cars of a train, sightseeing busses or taxi cabs making sightseeing tours along a given track or circuit may be equipped with the record reproducing speaker which supplies the information which is otherwise supplied by a guide.

Finally mixed information relating partly to monuments and landmarks and their history and partly to the topography of the country, the traffic conditions, intersections and railroad crossings and to safe driving in general may be supplied to every driver travelling along a certain road if his car is equipped with the apparatus and it is only necessary to supply the proper record for the road which has been selected and to insert it into the record playing apparatus.

To obtain the above outlined result a connection between the record reproducing speaking apparaus and the vehicle and a synchronization of the said record playing apparatus with the movement of the vehicle is obviously necesary. However, for practical reasons it is not possible to simply drive the record reproducing apparatus by the vehicle in order to obtain proportionality between the record played and the distance covered by the vehicle, using, for instance, a direct transmission from a wheel or from a moving part of the vehicle. The driving of a vehicle occurs at different speeds and therefore a record player which has to maintain a constant speed in order to be intelligible cannot be driven by a vehicle. Moreover the length of the record in an apparatus is limited and it is obviously neither necessary nor possible to provide information without pause during the time during which the vehicle is in motion.

It is therefore preferable to drive the driving means for the record reproducing speaking apparatus with its own regulated constant or substantially constant speed and to provide merely a synchronization between the starting and stopping of the record playing speaking device and the moving vehicle, without however establishing any permanent connection. Moreover it must be possible to arrest the motion of the record player for an appreciable time while the vehicle is still travelling and while still maintaining synchronization after restarting.

According to the invention this object is obtained by a special synchronization unit which is added to a normal record operated speaking apparatus and driven at a standard speed by its own motor, the latter being preferably an electric motor. The said special synchronization unit is in its turn driven by the vehicle and it essentially consists in a strip, tape, band or other element provided with perforations which cooperates with a switch or a similar unit governing the starting of the record reproducing instrument. The stopping of the record reproducing instrument may also be regulated by perforations, but practical and economical reasons make it preferable to stop the record reproducing instrument whenever the spoken communication is at an end. In this way the record carrier may be of the shortest possible length.

It is therefore an object of the invention to provide means for synchronizing the cooperation of a definite portion of a record carrying element with its reproducing elements which permits to deliver a definite informative statement forming an informative communication unit with the motion of a vehicle and more particularly with definite distances covered by the vehicle and reckoned from a predetermined starting point. Said informative units of communication are thus delivered at a definite point reached by the vehicle and predetermined by said synchronization unit, but are stopped as soon as the informative unit of communication connected with said point has come to an end.

It is a further object of the invention to provide a synchronization unit which comprises a perforated synchronizing element, preferably in the shape of a tape, band or film reeled on spools which may be readily inserted into and removed from a shaft which may be coupled with the shaft driven by the moving vehicle.

It is a further object of the invention to provide a synchronizing perforated element with a series of regularly spaced perforations running along its entire length for the purpose of advancing said synchronizing perforated element by means of a sprocket wheel engaging said regularly spaced perforations, thus imparting to said synchronizing perforated element a speed which is independent of the diameter of the coil on which it is wound and of the length which has already been paid out or taken up.

It is a further object of the invention to provide means for uncoupling the synchronizing element manually in order to permit the driver of a vehicle to maintain the synchronization if not proceeding in a straight forward manner along a road, for instance, in the case in which the driver makes unscheduled trips which bring the vehicle ultimately back to the starting point. The synchronizing element in this case is therefore at rest during the period during which the unscheduled trip has been made.

It is a further object of the invention to provide manual adjustment means for the perforated synchronizing element so as to bring the adjustment of said element into harmony with the distance of the selected point in the event that the vehicle should either have travelled over another road to an intermediate point at which the record playing apparatus should be started or in the event that the driver does not intend to use the apparatus for some time.

It is a further object of the invention to simplify the construction of the synchronizing apparatus by maintaining the perforated synchronizing element automatically in a stretched condition without permitting slacking, this object being attained by means of suitable frictional devices.

It is a further object of the invention to provide a cutting out switch for the record reproducing apparatus which is operated by elements fixed on the record carrying element itself, said elements operating a switch cutting out the driving motor of the record player at the end of the informative unit of communication delivered at a certain point.

Further objects of the invention will be apparent from the following detailed specification.

The invention is illustrated in the accompanying drawing showing one embodiment thereof. It is however to be understood that the example shown in the drawing and described in detail in the specification has been selected in order to explain the principle of the invention and the best mode of applying this principle. No survey has been given of the embodiments of the invention and of the modifications thereof which embody the principle of the invention and a departure from the example shown in the drawing is therefore not necessarily a departure from the principle of the invention.

In the drawing:

Figure 2 is a sectional elevational view of the same device a section being taken along the line 2—2 of Figure 1.

Figure 4 is a sectional elevational view of the devices associated with the adjustment knobs which are arranged in order to permit a rotational movement of the knobs in only one direction.

Figure 5 is a fragmentary view of the synchronizing perforated element showing the synchronizing perforations and the regularly spaced perforations for advancing said elements.

Figure 6 is a diagrammatic view of the switch which is associated with the record reproducing apparatus in order to cut out the driving unit of said apparatus after the delivery of an informative unit of communication.

Figure 7 is a diagram of the system showing all the parts thereof diagrammatically.

Figure 1:
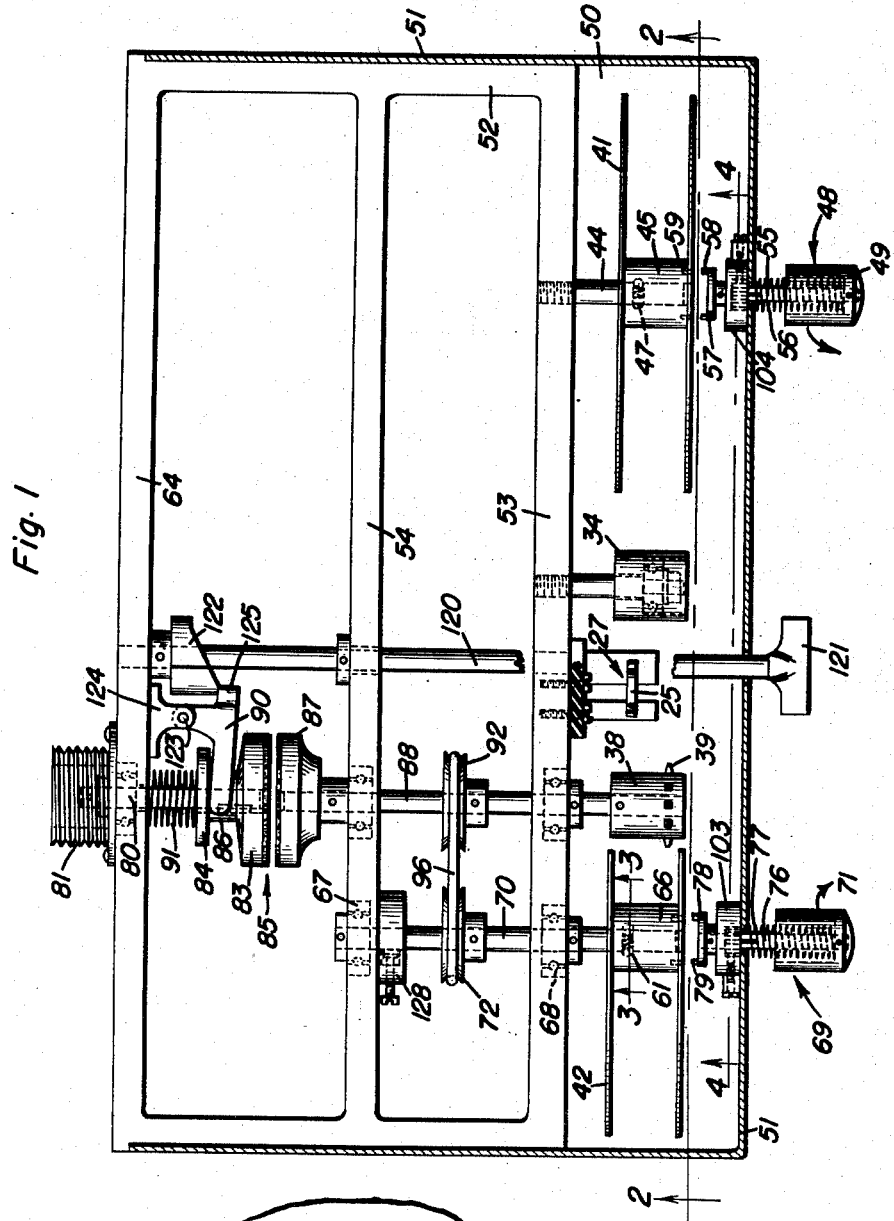
Figure 1 is a plan view partly in section of the synchronizing unit of the device.
Figure 3:
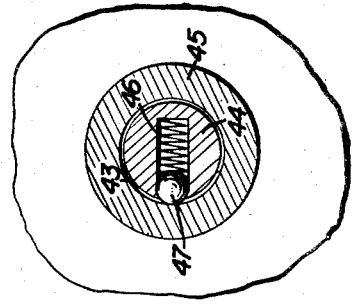
Figure 3 is a sectional elevational view of a detail of the frictional device which is used to hold one of the reels on its corresponding shaft or axle.

As above explained the main problem of a talking apparatus operated by a record and installed on a car in order to supply information connected with points reached successively by the car consists in keeping the record synchronized with the stretch of the road along which the car travels and in allowing adjustment to be made without difficulty whenever the driver chooses to deviate from the predetermined road and to select another road or a side road. The problem in this case consists in bringing the apparatus again into synchronism. A further problem consists in stopping the apparatus whenever the informative communication which is relative to a certain point has ended, this being mainly necessary in order to limit the length of the recording element to the minimum length which is necessary for the purpose in question.

The system according to the invention therefore consists in a record operated talking machine 10 which may be one of the well known magnetic wire players, which unit may be used without any change in its construction. The magnetic recorder 10 is driven by an electric motor forming part of the unit and not specially shown, the circuit of which is controlled on one hand by a synchronizing unit generally indicated at 11 and on the other hand by the switch 12 which is operated by the magnetic recorder in a way to be described below. Moreover a switch 19 is arranged in a circuit which is usually closed but may be opened manually in order to cut out the speaking apparatus while permitting the magnetic recorder to run in the same manner in which it would have run if the speaker would operate. This switch therefore permits to cut out the communication without however affecting the operation of the synchronizing unit of the magnetic recorder.

The synchronizing unit 11 comprises a switch generally indicated at 27 which controls the circuit 20 of the magnetic recorder by means of a relay 15 provided with an armature 18 with an actuating winding 16 and with a holding winding 17. It will therefore be clear that once the actuating winding 16 has been operated and the armature has been attracted the circuit 20 of the magnetic recorder is closed at contact 19 and as this circuit contains the holding winding 17 it remains closed until interrupted at the contacts of switch 12.

The synchronizing unit is mounted on a frame structure comprising a base plate 50, a number of frame members 53, 54 and 64 on said base plate and also comprising a cover-like box 51 which covers the whole structure or a major part of it and which is provided with the necessary openings for the adjustment knobs. The unit essentially comprises a perforated synchronizing element 30 consisting of a tape, film or band of insulating material in which a number of holes 31 have been punched along a line which is parallel with the edges of the tape, film or ribbon. Moreover the tape, strip, film or band 30 is provided with a series of regularly spaced marginal or central perforations 28 which are similar to those used in connection with picture carrying films, the said perforations engaging teeth 39 of a sprocket wheel 38. The strip, tape or film 30 is stored on a pay out spool 41 and is reeled off from this spool and received on a take up spool 42 (Figure 2). Between the two spools 41 and 42 the tape, strip or film runs over the sprocket wheel 38 and over the tension roller 34 and is held stretched between the sprocket wheel and the roller while traveling over the contact plate 24 of a switch 27 which is arranged on the line carrying the punched holes 31. The contact plate 24 of switch 27 cooperates with the contact spring 25 which faces the tape, film or strip on the other side so that the insulating strip, tape or film separates these two parts 24 and 25. Whenever one of the punched holes 31 passes the switch 27 the contact spring 25 which must be under slight elastic tension makes contact with plate 24, thus closing the relay circuit 29 which includes the actuating winding 16 of the relay 15.

The pay out spool 41 is freely rotatable on an axle 44 held in the frame section 53. The axle 44 is provided with a bore 46 containing a spring pressed ball 47 which is pressed against a groove 43 in the inner surface of the hub member 45. The spring pressing the ball against the hub member is designated by 46. The ball provides a frictional resistance keeping the tape, film or strip tensioned during unreeling and taking up any slack in the strip, tape or film which may develop.

To rewind or readjust the synchronizing tape, strip or film a rewinding device generally indicated at 48 is provided. This device consists of a knob 49 carried by a push rod 55 which is surrounded by a spring 56 so tensioned that it pushes the rod and the knob outwardly. The push rod 55 carries a head 57 provided with pins or protuberances 58 which may enter recesses 59 in the reel or spool 41 when the rod 55 is pushed inwardly. Upon engagement of the recesses 59 by the pins 58 the spool may be turned by operating the knob. As described later, a device 104 is provided preventing a turning of the knob in the wrong direction.

The take up spool 42 is of a construction which is similar to that of the spool 41. The take up spool is carried by a shaft 70 which turns in bearings 67, 68 provided in the frame sections 53 and 54. The shaft 70 also carries pulley 72 the purpose of which will be described below.

The take up spool 42 is loosely mounted on the shaft 70 and is coupled with said shaft by means of a ball device 61 which is very similar to the device 46, 47, 43 which has been described above in connection with spool 41. The ball device couples the hub 66 with the shaft 70 but permits a relative motion under friction.

In front of the spool 42 an adjustment device generally indicated at 69 is arranged which consists of a knob 71 held on a push rod 76. A spring 77 presses the knob 71 outwardly. On the inside of the cover or box 51 the push rod 76 carries a head 78 which is provided with pins or projections 79 engaging holes or recesses 73 in the front shield of spool 42. Obviously, when the knob 71 is depressed and turned around the pins or projections 79 engage the recesses 73 so that a turning of the knob will also turn the take up spool 42 thus advancing the tape or film 30 by hand in order to adjust its position.

The push rod 76 of knob 71 as well as the push rod 55 of device 49 are each provided with a device which makes them rotatable in one direction only. This device consists in a ratchet wheel 101 and 102 respectively keyed to the push rod 76 and 55 respectively which ratchet wheels are surrounded by a sleeve 103, 104 respectively. Each sleeve is provided with a tubular projection 105, 106 respectively. The tubular projection is provided with a bore 117, 107 respectively containing a spring 108, 109 respectively pressing on a detent 111 and 112 respectively. The teeth of the ratchet wheels are so disposed that the knob 71 acting on spool 42 can only be turned in a clockwise direction while knob 49 engaging spool 41 may only be turned in a counterclockwise direction.

The springs 108, 109 may be held by screws 113, 114 respectively which engage threads in the bores. By unscrewing the screws 113, 114 the detents may be lifted so that the knobs may be turned backwardly if this should prove to be desirable in an exceptional case.

The synchronizing device 11 is driven by the flexible speedometer shaft 36 by means of an intermediary gear wheel 75 mounted on the shaft leading to the speedometer 35 which drives a further gear wheel 77. The two gear wheels may be enclosed within a casing 61. The gear wheel 77 drives a further flexible shaft 37 which may be coupled with shaft 80 journaled in the frame member 64. A sleeve 81 may be provided around the ends of shaft 80. Said sleeve is provided with threads and is connected with the protecting outer sleeve of the flexible shaft 37 for holding the shaft 80 in a coupled condition with the flexible shaft 37.

The shaft 80 carries one member 83 of a friction coupling 85 the second member of the coupling being formed by member 87 which is rotatably connected with shaft 88 and the member 83 is provided with the usual grooved or recessed sleeve 84 the recess portion being indicated at 86. The recessed portion is engaged by a process or pin projecting from the shifting lever 90 of the coupling. A spring 91, inserted between the sleeve 84 and the frame member 64, has a tendency to press member 83 of the coupling against member 87.

The coupling member 87 is keyed on shaft 88 which may be journaled in ball bearings held in the frame members 54 and 53 and it carries a pulley 92 and sprocket wheel 38. The pulley 92 drives the pulley 72 on shaft 70 by means of a belt or cable 96.

The shifting lever 90 of the coupling is pivoted at 123 to a bracket 124 mounted on frame member 64. This lever has a projecting end 125 which is in contact and cooperates with a cam member 122 which is mounted fixedly on shaft 120. This shaft is a cross shaft in substantial parallelism with shaft 70, 80 and 88 which protrudes at the front end from casing 51 and reaches to the outside and at the end of the shaft a knob 121 is arranged to permit manual operation and rotation of the shaft 120. The turning of the knob 121 brings cam 122 into a position in which the projecting end 125 of shifting lever 90 may move rearwardly, thus permitting an engagement of the coupling members 83, 87 which are pressed against each other by means of spring 91. Obviously, if the knob 121 is turned so as to bring cam 122 into the position shown in Figure 1 the two members 83 and 87 are disengaged.

In the operative position of the coupling in which said members 83 and 87 of coupling 85 are engaged the take up spool 42 is driven by means of shaft 88, pulley 92, belt 96 and pulley 72 on shaft 70. The tape, strip or film 30 is therefore wound up on take up spool 42. As both shafts 88 and 70 are driven it will also be clear that simultaneously with the driving of the take up spool the sprocket wheel 38 is advanced and that the advance of the film, strip or tape 30 is regulated by the sprocket teeth of sprocket wheel 38.

As the take up spool takes up less film or tape when the winding of the film, tape or strip starts for a given angular displacement of the shaft than later when the diameter of the coiled tape, film or strip increases, it is necessary to provide for a frictional coupling between the take up spool 42 and the shaft 70 which permits sliding of the spool and which keeps the stretch of the tape, film or strip between the sprocket wheel 38 and the spool 42 taut so as to prevent a slackening of said tape, film or strip 30. The strip, film or tape 30 is tightened automatically by the fact that during the operation of the spool 42 the diameter of the coiled film, tape or strip increases constantly.

A friction device 128 may be mounted on the frame for holding shaft 70 and for preventing a slackening of the tape 30 during the uncoupling of the shaft 88.

The switch 12 consists of two contact springs 130 and 131 which are held in contact with each other by means of an arm 132 pivoted to a bracket 133 the latter being held in the casing of the record player in a manner not shown. The arm 132 is provided with a button or pin 134 which presses against one of the springs of the pair 131, 130 and which holds the spring 131 firmly pressed against the second spring. The spring 136 attached between the arm 132 and the bracket 133 holds the former in its normal position which is shown in Figure 6. On the arm 132 a finger 140 is pivotally held and fixed in its position by means of a leaf spring 142. The finger is provided with a narrow slot 144 through which the record wire 150 of the record player runs. The slot is preferably so narrow that only the wire can pass.

Small beads 148 made of plastic or of other suitable material may be fixed on the magnetic record wire at the required distances. These beads are so small that they do not interfere with the reeling of the magnetic record wire. They need not be larger than the knots with which the wire ends are customarily tied or spliced and which are currently used in connection with such record players.

When a bead reaches the finger 140 upon a movement of the magnetic record player wire 150 for instance from right to left in Figure 6 the finger 140 will be turned to the left in Figure 6 against the tension of the spring 136. On account of the tongue 145 which is pressed against the arm 132 the entire arm 132 will move around its pivot 138 when the finger is moved by the bead 148. The arm 132 is therefore turned in a counter-clockwise direction thus relieving the pressure exercised on spring 131 so that the switch contacts are opened. The opening of the circuit 20 which is a holding circuit of the relay 15 causes the relay to fall back and thereby to open the supply circuit for the record player which is thus stopped.

The stopping of the record player is however not performed in such an instantaneous manner that the wire 150 is arrested in the position in which the lever 132 opens the springs 130 and 131. The wire still continues to be paid out for a little while and therefore the bead 148 is advanced along the wire and this advance will move the finger 144 to such an extent that it will leave the bead and will snap back into its original position.

When the magnetic recording wire 150 is wound back manually the bead will also engage the fingers 140 but will not move the arm 132; it will simply move the finger around its pivot and press back the spring 142. Automatically, when the beads 148 have left the fingers behind the latter will snap back on account of the action of the spring 142 on the tongue 145.

In order to describe the operation it may be assumed, for instance, that the apparatus is used as a travel guide in an automobile explaining to the driver the structures, objects or monuments to be seen along a certain road and the historical, geographical, economical, political or industrial pecularities of the district through which he travels or the accommodations to be found within the district through which the road runs. This information may be interspersed with information relative to traffic conditions, to safe driving, to the speed which the driver should use, the crossings or intersections and the like. Of course the information may also relate to the guiding of the driver on an involved or circuitous route. In all these cases it is necessary that the information be delivered in communications forming a unit and more or less coincident with the reaching of a certain point of the road. Accordingly the synchronizing tape should be provided with marks, such as the figures 17, 35 which are shown in Figure 5 and which may be placed near the perforations in order to identify them with certain points of the road.

These marks may be viewed through a suitable opening in the front wall (not shown) by means of a mirror 152 with or without the help of a small lamp bulb.

The driver starting from some place in a big city for instance will select the synchronizing tape spool corresponding to the road which he intends to follow and the magnetic wire spool which starts near the point near which he thinks that the information will be desirable. For instance, this point may be a point near the city limits. The mark or figure of the synchronizing tape corresponding to the starting point of the wire recorder must be visible on the recorder spool to be inserted and the driver then turns knob 121 into the position in which cam 122 disengages the coupling 85, if this point does not correspond to his own starting point. He then turns the take up spool knob 71 until the correct mark or figure appears. He then drives to the point which he has selected as a starting point. When this point has been reached knob 121 is again turned so that the coupling members 83 and 87 are engaged and upon passage of the perforation, corresponding to the mark which has been brought into operative position, over the plate 24 of switch 27 the circuit 29 is closed. As this circuit includes the winding 16 of relay 15 the latter is energized by the battery 21 of the car and the relay 15 attracts armature 18 closing the circuit 20 of the magnetic record player. The record player now starts to deliver the first communication, the relay being kept energized by the holding winding 17 and contact 19 even after circuit 29 has been interrupted by the advance of the tape 30 which again separates the contact plate 24 from spring 25.

The first communication unit is now delivered and when terminated the bead 143 on the magnetic record wire again interrupts the circuit 20 by means of switch 12, as above described. When the switch 12 interrupts the circuit 20 the circuit through the holding winding 17 is also interrupted and the relay armature 18 drops back. The magnetic recorder is therefore again idle. However, tape 30 is continuously advanced in exact proportion with the distance which is covered by the car as it is driven by the flexible shaft 36 connected with the wheels. When a further explanation, instruction or warning has to be delivered which is connected with some predetermined point along the road a further perforation in the tape 30 will reach switch 27 and will permit the switch to close. The magnetic recorder is then again started for a second communication.

The driver when stopping or making side trips has merely to use the button 121 in order to make the synchronizing unit idle. However, when side trips carry the car to a point which is ahead of the point at which the main road was left or which is in the rear of this point the knobs 71, 49 permit the readjustment of the synchronizing unit in the two directions so that the apparatus may be brought again into correspondence with the position of the vehicle on the road.

It will also be clear that the apparatus such as described is merely fitted to one of the possible applications and that other applications of the apparatus are possible involving slight modifications of the construction and sometimes permitting a simplification of the equipment. For instance, magnetic records for high and for low speed may be made to cut down the time interval which would elapse at low speed driving between the communication and the actual sighting of the object to which the communication relates.

When used in trains or buses for the information of passengers the magnetic recorder may operate earphones or small speakers delivering audible speech only at a short distance. Moreover, wire recorders may be used which are provided with means for reeling and unreeling the magnetic wire or tape and which are further provided with marks which may correspond to the marks on the synchronizing tape.

It will also be clear that the various mechanical means which have been shown may be modified in many ways in order to suit special applications or requirements and such unessential modifications will not in any way affect the essence of the invention.

Having described the invention, what is claimed as new is:

1. An automatic control system for delivering spoken communications on a vehicle, related to a place reached by the vehicle after covering a distance from a freely selectable starting point, comprising an insulating synchronizing ribbon moved by the vehicle with a speed proportional to that of the vehicle and provided with synchronizing perforations placed on the ribbon at selected points corresponding to places reached by the vehicle, switch contacts on both sides of said ribbon and separated by the same, coming into operative momentary contact relation through said perforations when the latter pass the switch contacts, a self controlling independently operated record player with a reelable recording element carrying the messages to be delivered at certain places reached by the vehicle, having an electric drive motor, drawing the reelable record element through the record player and a sound reproducer and an energizing circuit for the drive motor and sound reproducer, controlled by the reelable recording element, operacontrol means being a self locking control relay with control contacts and with two windings, one of said windings being an impulse winding, the other winding being a locking winding, included in the said energizing circuit of the electric drive motor and sound reproducing device, the relay contacts controlling said energizing circuit and keeping the same closed after the initial closing of the relay by the energization of the impulse winding, the second control means of the energizing circuit being a stop switch, controlled by two control means, one of the ating means for said stop switch, including means on said reelable recording element operating said operating means at the end of each communication associated with the particular place located a distance from a starting point reached by the vehicle, an impulse circuit including the impulse winding of the relay and the switch contacts on both sides of the synchronizing ribbon, said contacts, upon momentary closure, sending the impulse energizing the aforesaid control relay, coupling means between the vehicle and the synchronizing ribbon, operable by the driver of the vehicle, and adjusting means for the said ribbon for adjusting the position of the perforations relatively to the switch contacts cooperating with the same, each communication of the record player being thus started at the desired place reached by the vehicle, but being delivered independently of the motion or speed of the vehicle.

2. An automatic control system for delivering spoken communications on a vehicle related to a place reached by said vehicle or to a distance covered by said vehicle after leaving a freely selectable point of departure, comprising a record player with electric driving means, and with a movable and reelable record element, and with a sound producing device, means for energizing said electric driving means and sound producing device, the aforesaid means being controlled by an energizing circuit, a synchronizing device including a ribbon provided with regularly spaced perforations and with controlling perforations at predetermined points on said ribbon, means for moving said perforated ribbon including a sprocket wheel engaging the regularly spaced perforations, spools on both sides of the sprocket wheel for taking up and paying out said ribbon, respectively, said sprocket wheel upon rotation moving the said ribbon in exact accordance with its rotational movement and unwinding it from one spool while winding it on the other spool, means for moving said sprocket wheel including a speedometer shaft, driven by the movement of the vehicle, in proportion to the distance covered by the vehicle when in motion, a drive shaft for said sprocket wheel, a disengageable coupling between the said speedometer shaft and said drive shaft, and operative means for engaging and disengaging said coupling, a further shaft carrying the takeup spool, means for driving said last named shaft from said drive shaft, a frictional coupling means between the takeup spool and the shaft by which it is driven, an impulse producing contact device cooperating with said perforated ribbon operated by the controlling perforations to produce a starting impulse, an impulse circuit controlled by said contact device, a relay with a plurality of windings and with relay contacts controlling the energizing circuit of the electric driving means of the record player and of the sound producing device, one of said relay windings being an impulse winding energized upon delivery of an impulse by the said contact device, and a further relay winding included in said energizing circuit holding the relay contacts closed once the starting impulse has been delivered, a stop switch interrupting the said energizing circuit for the electric driving means and sound producing means of the record player when operated, mechanical operating means for said stop switch, means carried on the reelable record element at the termination of each communication for operating said mechanical operating means of said stop switch, when operated de-energizing the said driving means and stopping the further advance of the record element and the operation of the sound producing device.

3. An automatic control system for delivering spoken communications on a vehicle related to a place reached by said vehicle or to a distance covered by said vehicle after leaving a freely selectable point of departure, comprising a record player with electric driving means, with a reelable record element, and with a sound producing device, means for energizing said electric means and sound producing device, the aforesaid means being controlled by an energizing circuit, a synchronizing device including a ribbon provided with regularly spaced perforations and with controlling perforations at predetermined points on said ribbon, means for moving said perforated ribbon, including a sprocket wheel engaging the regularly spaced perforations, spools on both sides of the sprocket wheel for taking up and paying out said ribbon, respectively, said sprocket wheel upon rotation moving the said ribbon in exact accordance with its rotational movement and unwinding it from one spool while winding it on the other spool, means for moving said sprocket wheel including a speedometer shaft, driven by the movement of the vehicle and proportional to the distance covered by the vehicle when in motion, a drive shaft for said sprocket wheel, a disengageable coupling between the said speedometer shaft and said drive shaft, and operative means for engaging and disengaging said coupling, a further shaft carrying the takeup spool, means for driving said last named shaft from said drive shaft, a frictional coupling means between the takeup spool and the shaft by which it is driven, a manually adjustable, rotatable and longitudinally displaceable knob arranged in front of each of the spools, a coupling, normally disengaged, between each rotatable and longitudinally displaceable knob and the spool in front of which it is arranged, coupling elements connected with said knobs and spools, engageable upon longitudinal displacement of the knobs, to adjust the position of the synchronizing ribbon and its correspondence with the distance covered by the vehicle in motion, an impulse producing contact device cooperating with the perforated ribbon and operated by the controlling perforations to produce a starting impulse, an impulse circuit controlled by said contact device, a relay with a plurality of windings and with relay contacts controlling the energizing circuit of the electric driving means of the record player and of the sound producing device, one of said relay windings being an impulse winding energized upon delivery of an impulse by the said contact device, and a further relay winding included in said energizing circuit, holding the relay contacts closed once the starting impulse has been delivered, a stop switch in the said energizing circuit for the record player and its sound producing means, mechanical operating means for operating said stop switch and means carried by the reelable record element at the termination of each communication for operating said mechanical operating means, said stop switch, when operated, interrupting the energizing circuit of the record driving means and the sound producing device, thereby de-energizing the said driving means and stopping the further advance of the record element and the operation of the sound producing device.

4. An automatic control system for delivering spoken communications on a vehicle related to a place reached by said vehicle or to a distance covered by said vehicle after leaving a freely selectable point of departure, comprising a record player with electric driving means, with a reelable record element, and with a sound producing device, means for energizing said electric means and sound producing device, the aforesaid means being controlled by an energizing circuit, a synchronizing device including a ribbon provided with regularly spaced perforations and with controlling perforations at predetermined points on said ribbon, means for moving said perforated ribbon, including a sprocket wheel engaging the regularly spaced perforations, spools on both sides of the sprocket wheel for taking up and paying out said ribbon, respectively, said sprocket wheel upon rotation moving the said ribbon in exact accordance with its rotational movement and unwinding it from one spool while winding it on the other spool, means for moving said sprocket wheel, including a speedometer shaft, driven by the movement of the vehicle in proportion to the distance covered by the vehicle when in motion, a drive shaft for said sprocket wheel, a disengageable coupling between the said speedometer shaft and said drive shaft, and operative means for engaging and disengaging said coupling, a further shaft carrying the takeup spool, means for driving said last named shaft from said drive shaft, a frictional coupling means between the takeup spool and the shaft by which it is driven, a manually adjustable, rotatable and longitudinally displaceable knob arranged in front of each of said spools, a coupling, normally disengaged, between each rotatable and longitudinally displaceable knob and the spool in front of which the knob is arranged, with coupling elements connected with said knobs and spools, engageable upon longitudinal displacement of the knobs, said coupling elements including an adjusting and guiding rod and a head on each rod, and means on said head for engaging the spool and for rotating the same after longitudinal displacement of the knob, in order to adjust the position of correspondence of the ribbon relatively to the distance covered by the vehicle, a ratchet wheel and a ratchet pawl for each knob, preventing rotational movement of the knob in one direction, the direction of the free rotational movement and the locked direction for the two knobs being different, an impulse producing contact device cooperating with said perforated ribbon and operated by the controlling perforations of the same to produce a starting impulse, an impulse circuit controlled by said contact device, a relay with a plurality of windings and with relay contacts controlling the energizing circuit of the electric driving means of the record player and of the sound producing device, one of said relay windings being an impulse winding energized upon delivery of an impulse by the said contact device, and a further relay winding included in said energizing circuit holding the relay contacts closed once the starting impulse has been delivered, a stop switch interrupting the said energizing circuit for the electric record player and sound producing means of the record player, mechanical operating means for said stop switch and means carried by the reelable record element at the termination of each communication for operating the last named operating means, said stop switch when operated de-energizing the said driving means and stopping the further advance of the record element and the operation of the sound producing device.

5. A system as claimed in claim 2 wherein the means for operating the stop switch consists in beads attached to the reelable recording element after each communication, and further consists in a switch operating slotted member straddling the recording element and entrained by the beads attached to said element and opening said last named switch, thus interrupting the operation of the sound producing and recording element advancing means.

GEORGE R. CULBERTSON.

References Cited in the file of this patent

UNITED STATES PATENTS

| Number | Name | Date |
|---|---|---|
| 909,502 | Woodruff | Jan. 12, 1909 |
| 1,063,085 | Thormeyer | May 27, 1913 |
| 1,168,053 | Boyden | Jan. 11, 1916 |
| 1,268,472 | Kellum | June 4, 1918 |
| 2,066,041 | Kiel | Dec. 29, 1936 |
| 2,152,296 | Weis | Mar. 28, 1939 |
| 2,442,887 | Buente | June 8, 1948 |

FOREIGN PATENTS

| Number | Country | Date |
|---|---|---|
| 482,536 | Great Britain | Mar. 31, 1938 |
| 843,680 | France | July 7, 1939 |